(12) United States Patent  
Wang et al.

(10) Patent No.: US 12,190,232 B2  
(45) Date of Patent: Jan. 7, 2025

(54) ASYCHRONOUS TRAINING OF MACHINE LEARNING MODEL

(71) Applicant: MICROSOFT TECHNOLOGY LICENSING, LLC, Redmond, WA (US)

(72) Inventors: Taifeng Wang, Redmond, WA (US); Wei Chen, Redmond, WA (US); Tie-Yan Liu, Redmond, WA (US); Fei Gao, Redmond, WA (US); Qiwei Ye, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1071 days.

(21) Appl. No.: 16/327,679

(22) PCT Filed: Aug. 17, 2017

(86) PCT No.: PCT/US2017/047247  
§ 371 (c)(1),  
(2) Date: Feb. 22, 2019

(87) PCT Pub. No.: WO2018/039011  
PCT Pub. Date: Mar. 1, 2018

(65) Prior Publication Data  
US 2019/0197404 A1   Jun. 27, 2019

(30) Foreign Application Priority Data  
Aug. 25, 2016   (CN) .......................... 201610730381.8

(51) Int. Cl.  
*G06N 3/08*   (2023.01)  
*G06N 3/04*   (2023.01)  
(Continued)

(52) U.S. Cl.  
CPC ................. *G06N 3/08* (2013.01); *G06N 3/04* (2013.01); *G06N 3/045* (2023.01); *G06N 3/084* (2013.01)

(58) Field of Classification Search  
CPC .......... G06N 3/08; G06N 3/04; G06N 3/0454; G06N 3/084; G06N 3/02; G06N 20/00  
See application file for complete search history.

(56) References Cited

U.S. PATENT DOCUMENTS

| 8,027,938 B1 | 9/2011 | Xu et al. |
| 9,218,573 B1 | 12/2015 | Corrado et al. |

(Continued)

FOREIGN PATENT DOCUMENTS

| CN | 104346214 A | 2/2015 |
| CN | 105022699 A | 11/2015 |

(Continued)

OTHER PUBLICATIONS

De, S., Taylor, G., & Goldstein, T. (2015). Scaling Up Distributed Stochastic Gradient Descent Using Variance Reduction. arXiv preprint arXiv:1512.02970v1. (Year: 2015).*

(Continued)

*Primary Examiner* — Van C Mang

(57) ABSTRACT

Various implementations relate to asynchronous training of a machine learning model. A server receives feedback data generated by training the machine learning model from a worker. The feedback data are obtained by the worker with its own training data and are associated with previous values of a set of parameters of the machine learning model at the worker. The server determines differences between the previous values and current values of the set of parameters at the server. The current value may have been updated for once or more due to operation of other workers. Then, the server can update the current values of the set of parameters based on the feedback data and the differences between (Continued)

values of the set of parameters. Thus, the updating does not only take the training result of each worker into consideration but also makes proper compensation for delay between different workers.

20 Claims, 11 Drawing Sheets

(51) Int. Cl.
    *G06N 3/045*     (2023.01)
    *G06N 3/084*     (2023.01)

(56) References Cited

U.S. PATENT DOCUMENTS

| | | | |
|---|---|---|---|
| 9,269,057 | B1 | 2/2016 | Chandra et al. |
| 10,152,676 | B1 * | 12/2018 | Strom .................... G06N 20/00 |
| 2003/0009742 | A1 | 1/2003 | Bass et al. |
| 2014/0379386 | A1 | 12/2014 | Drennan, III |
| 2015/0127337 | A1 | 5/2015 | Heigold et al. |

FOREIGN PATENT DOCUMENTS

| | | |
|---|---|---|
| CN | 105683944 A | 6/2016 |
| CN | 105825269 A | 8/2016 |
| CN | 105894087 A | 8/2016 |

OTHER PUBLICATIONS

Hsu, D., Karampatziakis, N., Langford, J., & Smola, A. (2011). Parallel online learning. arXiv preprint arXiv:1103.4204. (Year: 2011).*
J Reddi, S., Hefny, A., Sra, S., Poczos, B., & Smola, A. J. (2015). On variance reduction in stochastic gradient descent and its asynchronous variants. Advances in neural information processing systems, 28. (Year: 2015).*
Agarwal, A., & Duchi, J. C. (2011). Distributed delayed stochastic optimization. Advances in neural information processing systems, 24. (Year: 2011).*
Witold Pedrycz, "Cluster-Centric Fuzzy Modeling", IEEE, 2014 (Year: 2014).*
Irina Higgins, "Early Visual Concept Learning with Unsupervised Deep Learning", 2016 (Year: 2016).*
Mu Li, "Communication Efficient Distributed Machine Learning with the Parameter Server" (Year: 2014).*
Ziangru Lian, "A Comprehensive Linear Speedup Analysis for Asynchronous Stochastic Parallel Optimization from Zeroth-Order to First-Order", (Year: 2016).*
"Notice of Allowance Issued in Chinese Patent Application No. 201610730381.8", Mailed Date: Mar. 26, 2021, 5 Pages.
"First Office Action and Search Report Issued in Chinese Patent Application No. 201610730381.8", Mailed Date : Nov. 4, 2020, 8 Pages.
Q. Meng et al., "Asynchronous Accelerated Stochastic Gradient Descent", Proceedings of the Twenty-Fifth International Joint Conference on Artificial Intelligence (IJCAI-16): 1853-1859 (2016).
X. Lian et al., "Asynchronous Parallel Stochastic Gradient for Nonconvex Optimization", Department of Computer Science, University of Rochester: 1-31 (2015) (revised 2017).
S. Becker et al., "Improving the Convergence of Back-Propagation Learning with Second Order Methods", Proceeding of the 1988 Connectionist Models Summer School: 29-37(1989).
International Search Report and Written Opinion for PCT/US2017/047247, mailed Nov. 10, 2017.
"Office Action Issued in European Patent Application No. 17758721. 9", Mailed Date: Mar. 19, 2020, 12 Pages.
"Distributed Machine Learning Toolkit", Retrieved From: http://www.dmtk.io/, Aug. 24, 2016, 2 Pages.

Agarwal, et al., "Distributed Delayed Stochastic Optimization", Proceedings of Neural Information Processing Systems, Dec. 12, 2011, 9 Pages.
Avron, et al., "Revisiting Asynchronous Linear Solvers: Provable Convergence Rate through Randomization", in Journal of the ACM, vol. 62, Issue 6, Dec. 2015, 27 Pages.
Bahdanau, et al., "Neural Machine Translation by Jointly Learning to Align and Translate", in Proceeding of International Conference on Learning Representations, May 7, 2015, 15 Pages.
Bottou, Leon, "Stochastic Gradient Descent Tricks", in Publication of Neural Networks: Tricks of the Trade, Springer, Nov. 17, 2012, 16 Pages.
Chan, et al., "Distributed Asynchronous Optimization of Convolutional Neural Networks", in Publication of Interspeech 2014, Sep. 20, 2015, 6 Page.
Chen, et al., "Revisiting Distributed Synchronous SGD", in Repository of: https://arxiv.org/abs/1604.00981, Apr. 15, 2016, 5 Pages.
Chen, et al., "Scalable Training of Deep Learning Machines by Incremental Block Training With Intra-Block Parallel Optimization and Blockwise Model-Update Filtering", in Proceedings of IEEE International Conference on Acoustics, Speech and Signal Processing, Mar. 20, 2016, pp. 5880-5884.
Dean, et al., "Large scale distributed deep networks", in Proceedings of 26th Annual Conference on Neural Information Processing System, Dec. 3, 2012, 9 Pages.
Duchi, et al., "Asynchronous Stochastic Convex Optimization", Retrieved From: https://arxiv.org/pdf/1508.00882.pdf, Aug. 4, 2015, 38 Pages.
Faraby, Said Al., "A More Robust Asynchronous SGD", in Master Thesis of University of Amsterdam, Feb. 2015, 46 Pages.
Folland, G, "Higher-Order Derivatives and Taylors Formula in Several Variables", Retrieved From: https://sites.math.washington.edu/~folland/Math425/taylor2.pdf, Aug. 17, 2016, 4 Pages.
Gupta, et al., "Model Accuracy and Runtime Tradeoff in Distributed Deep Learning", in Repository of: https://arxiv.org/pdf/1509.04210.pdf, Sep. 2015, 10 Pages.
Hastie, et al., "The Elements of Statistical Learning", in Publication of Springer Series in Statistics, Jan. 2009, 758 Pages.
He, et al., "Deep Residual Learning for Image Recognition", in Proceedings of the IEEE Conference on Computer Vision and Pattern Recognition, Jun. 26, 2016, pp. 770-778.
Heigold, et al., "Asynchronous Stochastic Optimization for Sequence Training of Deep Neural Networks", in Proceedings of the IEEE International Conference on Acoustic, Speech and Signal Processing, May 4, 2014, pp. 5624-5628.
Ho, et al., "More Effective Distributed ML via a Stale Synchronous Parallel Parameter Server", in Proceedings of Advances in Neural Information Processing Systems 26, Dec. 5, 2013, 9 Pages.
He, Kaiming, "Deep Residual Learning for Image Recognition", Retrieved From: https://web.archive.org/web/20170104075218/https://github.com/KaimingHe/deep-residual-networks, Jan. 4, 2017, 3 Pages.
Khalil-Hani, et al., "A-SDLM: An Asynchronous Stochastic Learning Algorithm for Fast Distributed Learning", in Proceedings of the 13th Australasian Symposium on Parallel and Distributed Computing, Jan. 27, 2015, pp. 75-84.
Kingma, et al., "Adam: A method for Stochastic Optimization", in Proceedings of the International Conference on Learning Representations, May 7, 2015, 15 Pages.
Krizhevsky, et al., "ImageNet Classification with Deep Convolutional Neural Networks", in Proceedings of the 26th Annual Conference on Neural Information Processing Systems, Dec. 3, 2012, pp. 1-9.
Krizhevsky, Alex, "Learning Multiple Layers of Features From Tiny Images", in Technical report, Apr. 8, 2009, 60 Pages.
Sercu, et al., "Very Deep Multilingual Convolutional Neural Networks for LVCSR", in Proceedings of the IEEE International Conference on Acoustics, Speech and Signal Processing, Mar. 20, 2016, pp. 4955-4959.
McMahan, et al., "Delay-Tolerant Algorithms for Asynchronous Distributed Online Learning", in Proceedings of Annual Conference on Neural Information Processing Systems, Dec. 8, 2014, 9 Pages.

(56) References Cited

OTHER PUBLICATIONS

Mikolov, et al., "Distributed Representations of Words and Phrases and their Compositionality", in the Proceedings of the 27th Annual Conference on Neural Information Processing Systems, Dec. 5, 2013, 9 Pages.

Niu, et al., "Hogwild: A Lock-Free Approach to Parallelizing Stochastic Gradient Descent", in Proceedings of Advances in Neural Information Processing Systems, Dec. 12, 2011, 9 Pages.

Odena, Augustus, "Faster Asynchronous SGD", in Repository of: https://arxiv.org/pdf/1601.04033.pdf, Jan. 15, 2016, 10 Pages.

Zheng, et al., "Asynchronous Stochastic Gradient Descent with Delay Compensation for Distributed Deep Learning", in Journal of Computing Research Repository, Sep. 27, 2016, 12 Pages.

Russakovsky, et al., "ImageNet Large Scale Visual Recognition Challenge", in International Journal of Computer Vision, vol. 115, Issue 3, Dec. 2015, 43 Pages.

Sak, et al., "Long Short-Term Memory Recurrent Neural Network Architectures for Large Scale Acoustic Modeling", in Proceedings of Fifteenth Annual Conference of the International Speech Communication Association, Sep. 14, 2014, pp. 338-342.

Silver, et al., "Mastering the Game of Go with Deep Neural Networks and Tree Search", in Journal of Nature, vol. 529, Jan. 28, 2016, 20 Pages.

Szegedy, et al., "Inception-V4, Inception-Resnet and the Impact of Residual Connections on Learning", in Repository of: https://arxiv.org/abs/1602.07261, Feb. 23, 2016, 12 Pages.

Zhang, et al., "Deep learning with Elastic Averaging SGD", in Proceedings of the Annual Conference on Neural Information Processing Systems, Dec. 7, 2015, 9 Pages.

Zhang, et al., "Staleness-aware Async-SGD for Distributed Deep Learning", in Proceedings of the Twenty-Fifth International Joint Conference on Artificial Intelligence, Jul. 9, 2016, 7 Pages.

\* cited by examiner

ASYCHRONOUS TRAINING OF MACHINE LEARNING MODEL

CROSS-REFERENCE TO RELATED APPLICATION

This application is a U.S. National Stage Application of PCT/US2017/047247, filed Aug. 17, 2017, which claims benefit of Chinese Patent Application No. 201610730381.8, filed Aug. 25, 2016, which applications are hereby incorporated by reference. To the extent appropriate, a claim of priority is made to each of the above disclosed applications.

BACKGROUND

Machine learning has been widely used in the field of speech recognition, computer vision, and natural language processing and so on. For example, Deep Neural Networks (DNNs) enables parallel training of machine learning models with multiple levels and parameters based on big data and powerful computational resources. In the training phase, one or more parameters of the model should be trained based on the given set of training data and the optimization objective. For instance, Stochastic Gradient Descent (SGD) may be employed for training the neural network.

It is known that a set of training data may be distributed across multiple workers which optimize the model parameters with their respective training data and return the result to a central server. However, the key problem of distributed or asynchronous model training is mismatch between workers. For instance, if a worker returns its updated parameters, the model parameters at the server may have been updated for one or more times by other workers. Accordingly, it is desirable to reduce or eliminate the delay or mismatch during asynchronous training of the machine learning model.

SUMMARY

All the conventional solutions are based on the theoretical knowledge that delay or mismatch between workers results from inconsistency between performances of different workers and/or communications between the server and different workers. Therefore, conventional solutions focus on reducing delay by optimizing scheduling or the like. However, through research, the present inventors find that such delay is inherent in the asynchronous architecture and cannot be eliminated by optimizing scheduling. Hence, implementations of the subject matter described herein are intended to compensate for, rather than to eliminate, delay between different workers, which distinguishes the subject matter described herein from any known solutions from the perspective of operation principles and mechanism.

In general, according to the implementations of the subject matter described herein, the server receives from the workers feedback data generated by training a machine learning model. The feedback data are obtained by the worker with its own training data and are associated with the previous values of the set of parameters of the machine learning model at this particular worker. The server determines differences between the previous values and current values of the set of parameters at the server. It is to be understood that the current values may have been updated for one or more times due to operation of other workers. Then, the server updates the current values of the set of parameters based on the feedback data and the differences between the values of the set of parameters. Therefore, the updating does not only take the training result of each worker into account but also makes proper compensation for delay between different workers. It has been shown by practice that compared with the conventional solution which tries to eliminate delay by purpose, implementations of the subject matter described herein can reduce mismatch between different workers significantly and realize effective and efficient asynchronous training of the machine learning model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood that these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Architecture of Asynchronous Training

Figure 1:
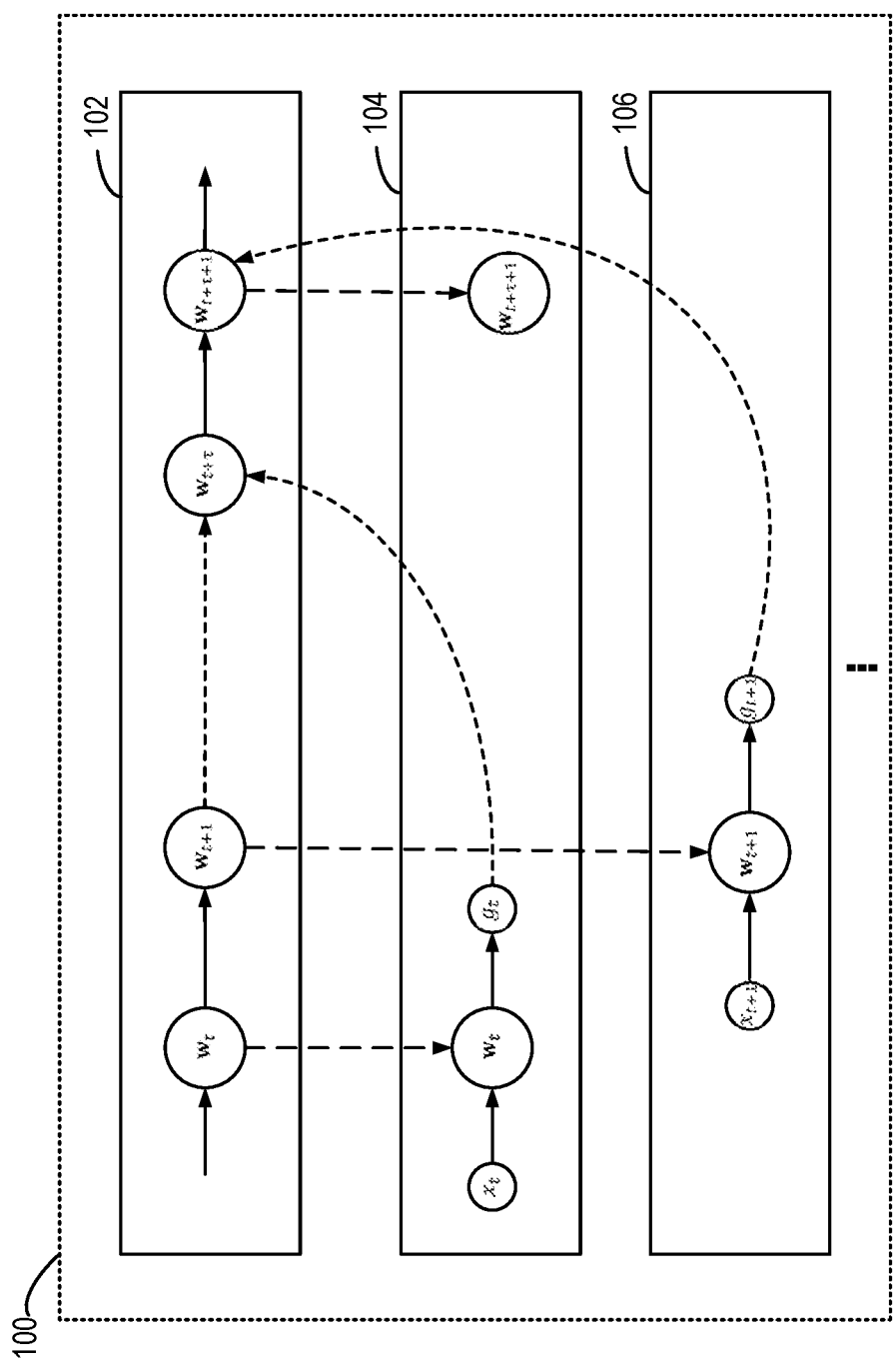
FIG. 1 illustrates a block diagram of the environment where the implementations of the subject matter described herein can be implemented.

FIG. 1 illustrates a block diagram of a parallel computing environment 100 in which implementations of the subject matter described herein can be implemented. It is to be understood that structures and functions of the environment 100 are illustrated by way of example, without suggesting any limitations on the scope of the subject matter described herein. The subject matter described herein can be embodied in different structures and/or functions.

The parallel computing environment 100 includes a server 102, worker 104 and a worker 106. It is to be understood that the number of servers and workers shown in FIG. 1 is for illustrative purposes only without suggesting any limitations and there may be any number of servers and workers. For instance, in a parameter server framework, the server 102 can be implemented in a distributed manner by a plurality of servers. In some implementations, the workers 104 and 106 and so on can be implemented by one or more graphics processing units (GPUs) or a GPU cluster.

In operation, each worker has its own training data. For example, the training data of each worker may be a subset of a complete set of training data. For each worker, the subset of training data can be obtained by sampling randomly from the complete set of training data. According to the predefined optimization objective, each worker trains the model independently and returns the result to the server 102. The server 102 updates parameters of the new model according to feedback results of the workers 104 and 106 until the optimization objective is satisfied. As described above, in the process, delay and mismatch between different workers 104 and 106 are the major bottleneck constraining the training effect.

Basic Principles

The subject matter will be more clearly described below in connection with multi-classification learning based on a neural network model. However, it is to be understood that concepts of the subject matter described herein can be applied to various suitable machine learning models, particularly, neural network models.

Given a multi-classification problem, $\mathcal{X} = \mathbb{R}^d$ may be used to represent an input space, $\mathcal{Y} = \{1, \ldots, K\}$ may be used to represent an output space, and $\mathbb{P}$ may be used to represent the joint underlying distribution over the space $\mathcal{X} \times \mathcal{Y}$, in which d represents the dimension of the input space, $\mathbb{R}$ represents a set of real numbers and K represents the number of categories in the output space.

In the training process, generally there should be provided a training set comprising a plurality of data $\{(x_1, y_1), \ldots, (x_S, y_S)\}$, where S denotes the number of elements of the training set. Each element of the training set includes a pair of input and output which can be independent identically distribution (i.i.d.) sampled from a distribution $\mathbb{P}$. For instance, an element $(x_1, y_1)$ represents data consisting of an input $x_1$ and an output $y_1$. The total training objective is to learn a neural network model $O \in \mathcal{F}: \mathcal{X} \times \mathcal{Y} \to \mathbb{R}$ based on a training set, where $\mathcal{F}$ denotes a mapping space from space $\mathcal{X} \times \mathcal{Y}$ to real numbers. However, it is to be understood that the term "training" used herein may also represent a part of the training process. The set of parameters of the model can be denoted by an n-dimensional real vector, i.e., $\mathbf{W} \in \mathbb{R}^n$, where n is a natural number. In other words, the set of parameters may comprise one or more parameters. For the sake of convenience, the set of parameters may be sometimes called parameters or a parameter vector.

Generally, the neural network models have hierarchical structures, in which each node conducts linear combination and non-linear activation over its connected nodes in the lower layer. The model parameters are weights of edges between two layers. The neural network model produces an output vector, i.e., $O(x, k; \mathbf{W}); k \in \mathcal{Y}$ for each input $x \in \mathcal{X}$, indicating its likelihoods of belonging to different categories.

Because the underlying distribution $\mathbb{P}$ is unknown, the common way of learning or training the model is to minimize the loss function, which is a form of the optimization objective. Alternatively, the model may be trained by maximizing the utility function. Utility function typically has a form of its equivalent loss function, for instance, it may be represented by the opposite of the loss function. Thus, for the sake of simplification, implementations of the subject matter described herein can be described in combination with a loss function.

The loss function can represent a metric of overall loss for model optimization, where the loss may represent various factors such as misclassification errors and the like. A widely used loss function for deep neural networks is the cross entropy loss function, which is defined as, $$f(x, y; w) = -\sum_{k=1}^{K} (I_{(y=k)} \log \sigma_k(x; w)) \tag{1}$$

where I represents an indicator function, log represents a logarithm function, $$\sigma_k(x; w) = \frac{e^{O(x,k;w)}}{\sum_{k'=1}^{K} e^{O(x,k';w)}}$$

represents Softmax operation. The Softmax operation is well known in the art and is widely used in the problem of multi-class learning, the description of which is thus omitted here.

During the process of minimizing empirical loss function, $\mathbf{W}$ should be generally set with an initial value and changed iteratively according to training data until converged to parameter values $\mathbf{W}$ that minimize the loss function.

As described above, in the SGD approach, individual workers (for example, the workers 104 and 106) compute the gradients over respective mini-batches of data and add these gradients to the global model. By using a barrier, the local workers wait for one another until the gradients from all the local workers have been added to the global model. However, due to the barrier, the training speed of the model is decided by the slowest worker. To improve the training efficiency, an asynchronous stochastic gradient descent (asynchronous SGD, or ASGD) approach may be employed without barriers, and each worker continues its training process right after its gradient is added to the global model without waiting. Thus, the asynchronous SGD approach is more efficient than SGD approach since no waiting overhead is required.

The computing environment 100 as shown in FIG. 1 may be employed to implement the asynchronous SGD approach. At time t, the worker 104 receives the model parameters $\mathbf{W}_t$ from the worker 102. For example, the worker 104 can transmit to the server 102 a request for the current model parameters. After receiving the request, the server 102 transmits the model parameters $\mathbf{W}_t$ to the worker 104. Then, the worker 104 computes a local gradient $g(\mathbf{W}_t)$ based on the data $x_t$. The workers may also receive the data $x_t$ from other servers and data $x_t$ may be obtained by randomly sampling from a training set. The number of samples in the data $x_t$ may be one or more, and the subject matter described herein is not limited in this aspect. It is to be understood that term "stochastic gradient" not only contains the situation of training over one sample of data $x_t$, but also contains the situation of training over multiple samples of data $x_t$, which is sometimes called "mini-batch" gradient.

At the worker 104, a local gradient $g(W_t)$ can be obtained by computation. For instance, the value of $g(W_t)$ can be obtained by inputting data $x_t$ into the expression of the gradient $g(W_t)$. The worker 104 then transmits the gradient to the server 102, which adds the local gradient $g(W_t)$ into the global model parameters. However, as shown in FIG. 1, ahead of this, some other $\tau$ workers may have already added their local gradients to the global model parameters so that the global model parameters have been updated $\tau$ times and become $W_{t+\tau}$. The conventional ASGD algorithm ignores this problem, and simply adds the local gradient $g(W_t)$ to the global model parameter $W_{t+\tau}$:

$$W_{t+\tau+} = W_{t+\tau} - \eta g(W_t) \qquad (2)$$

where $\eta$ represents the learning rate and the equation is generally called the update rule. It is clear that the update rule of ASGD is not equivalent to that of sequential stochastic gradient descent (also called stand-alone stochastic gradient descent). In the ASGD approach, a "delayed" or "stale" local gradient $g(W_t)$ is added to the current global model parameters $W_{t+\tau}$. In contrast, in the sequential stochastic gradient descent, the global model parameters are updated based on the gradient with respect to $W_{t+\tau}$.

It is observed by conventional theories that it usually takes ASGD more iterations to reach the same accuracy as the sequential SGD. Sometimes, ASGD cannot obtain the same accuracy as sequential SGD, especially when the number of workers becomes large. There are multiple solutions to solve the problem of ASGD at present. In some solutions, delay of local gradients can be reduced by configuring a plurality of scheduling strategies. In some solutions, a smaller weight is set for a local gradient with a larger delay and a larger weight is set for a local gradient with a smaller delay. As another example, a local gradient with a delay larger than a threshold is abandoned, and the like. However, all these solutions fail to make full use of the local gradients and waste computing resources to some extent.

Conventional understanding attributes this delay to inconsistency between performances of different workers and/or communications between the server and different workers. Therefore, conventional solutions focus on reducing delay by optimizing scheduling or the like. However, it is realized by the present inventors that this understanding is inaccurate. The delay is inherent for ASGD and cannot be eliminated. As shown in FIG. 1, when the local gradient $g(W_t)$ is added to the global model parameters $W_{t+\tau}$, there must be the number of $\tau$ delays. Therefore, in accordance with the implementations of the subject matter described herein, in the asynchronous model training, the delay between different workers (for example, delay of the gradient) would be properly compensated rather than reduced.

Example Process

Principles of implementations according to the subject matter described herein have been described with reference to FIG. 1. It is to be understood that the principles can be readily extended to any proper models and scenarios applicable for ASGD. An example process of implementations of the subject matter described herein is illustrated with reference to FIG. 2. For the sake of convenience, FIG. 2 will still be described in combination with the computing environment 100 of FIG. 1.

At 202, the server 102 receives a request for the current values $W_t$ of the model parameters from the worker 104 at time t. As the model parameters are generally represented by multiple parameters, they may be called as a set of parameters. In response to the request, the server 102 transmits to the worker 104 the current values $W_t$ of the model parameters. In some implementations, time t may be represented by a count. For instance, time t increases by a count each time the global model parameters $W_t$ are updated.

Therefore, the worker 104 obtains the current values $W_t$ of the global model parameters from the server 102. Moreover, the worker 104 can receive one or more training data $x_t$ from a device hosting the data set such as a server. The number of samples in the training data is called as size of the small batch, depending on user's setting. In some implementations, the training data may be randomly sampled from a data set.

The worker 104 generates feedback data associated with the current values $W_t$ of model parameters by training the model. The training process implemented by the worker 104 may be only a part of the whole training process of the model. As an example, in some implementations, the feedback data indicate significant trends of change of the optimization objective of the model with respect to the current values $W_t$ of the model parameters. For example, in some implementations, the significant trends of change can be the largest trends of change and thus may be represented by a gradient $g(W_t)$ of the optimization objective with respect to the current values $W_t$ of the model parameters.

Particularly, it should be noted that the scope of the subject matter described herein is not limited to the mathematical representation of the "significant trend of change" or other physical quantities. The mathematical representations (for example, mathematical quantities, expressions, equations, or the like) used here are only described as examples with the sole purpose of facilitating those skilled in the art to understand the ideas and implementation of the subject matter described herein.

As described above, the optimization objective may be represented by a loss function. Thus, for the sake of convenience, the following description will be illustrated still in reference to the loss function. The worker 104 may compute the local gradient $g(W_t)$ of the loss function at the current values $W_t$ of the parameters based on the training data set. For many common loss functions, the local gradient $g(W_t)$ has a closed-form expression. Therefore, the values of the local gradient $g(W_t)$ may be obtained by inputting the training data to the expression. In this case, the training process performed by the worker 104 only determines the local gradient $g(W_t)$ based on the closed-form expression, namely, a part of the overall training process of the model.

Then, the worker 104 transmits the feedback data (for example, the local gradient $g(W_t)$) back to the server 102. In some implementations, when the worker 104 obtains the current values $w_t$ of global model parameters from the server 102, the server 102 stores the current values $w_t$ of model parameters as backup model parameters $W_{bak}(m)$, where m represents the identification of the worker 104.

As shown in FIG. 1, at time t+$\tau$ the server 102 receives from the worker 104 the feedback data generated by training the model, for example the local gradient $g(W_t)$ Then, the current values of model parameters have been updated to be $W_{t+\tau}$. Therefore, the feedback data in some implementations substantially represent significant trends of change of the optimization objective of the model with respect to the previous values $W_t$ of the model parameters.

Figure 2:
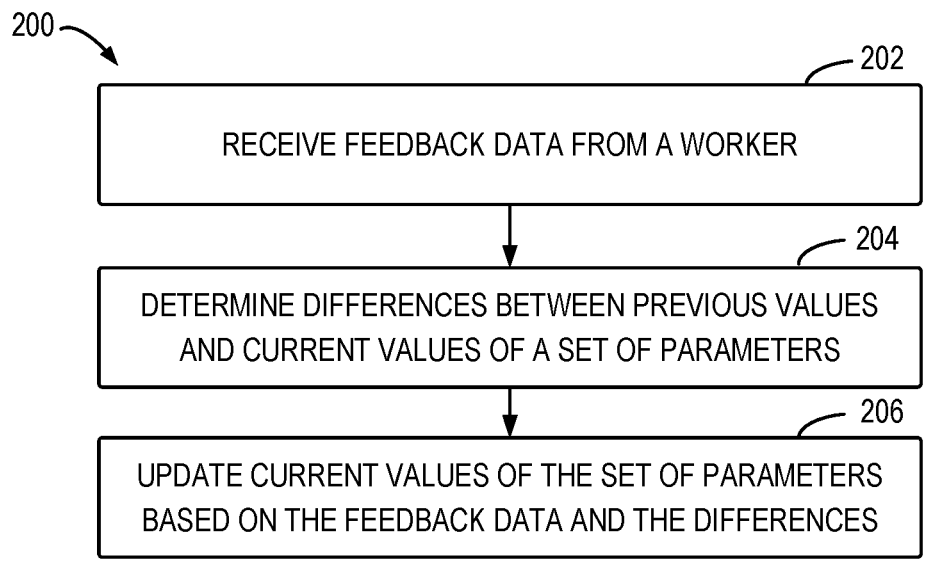
FIG. 2 illustrates a flow chart of the method for training the model according to the implementations of the subject matter described herein.
Figure 3A:
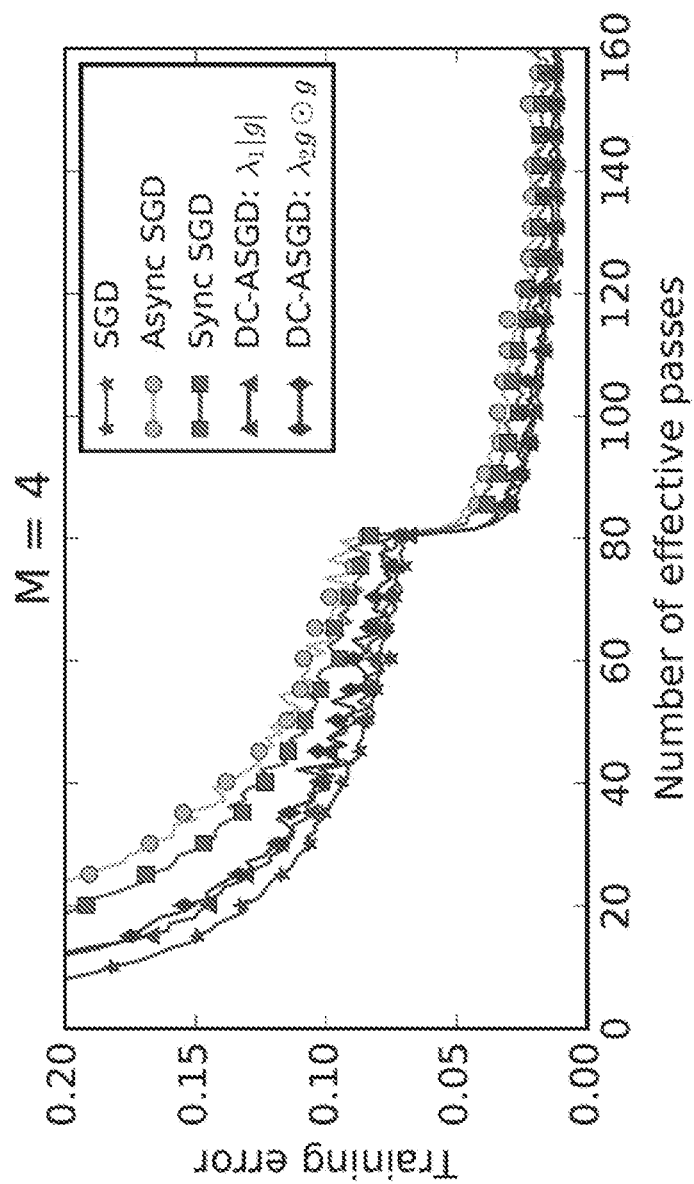
FIGS. 3A-3D illustrate graphs of performance comparison between the technical solutions according to the implementations of the subject matter described herein and the conventional solution.
Figure 3B:
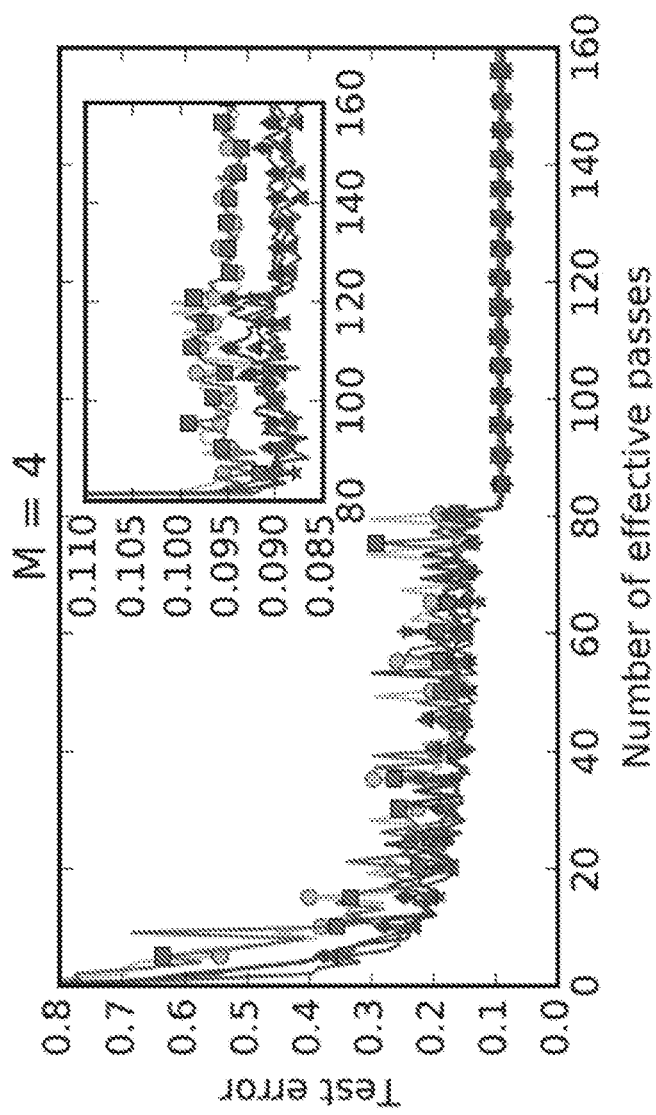
Figure 3C:
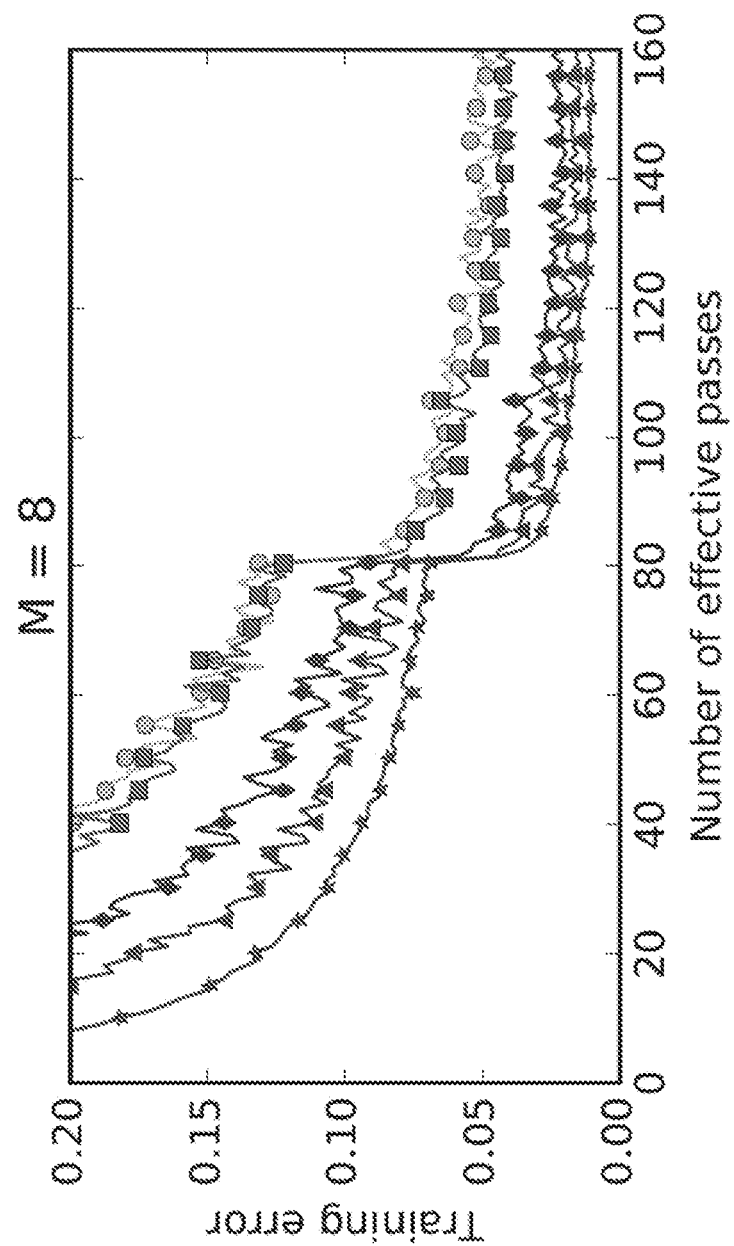
Figure 3D:
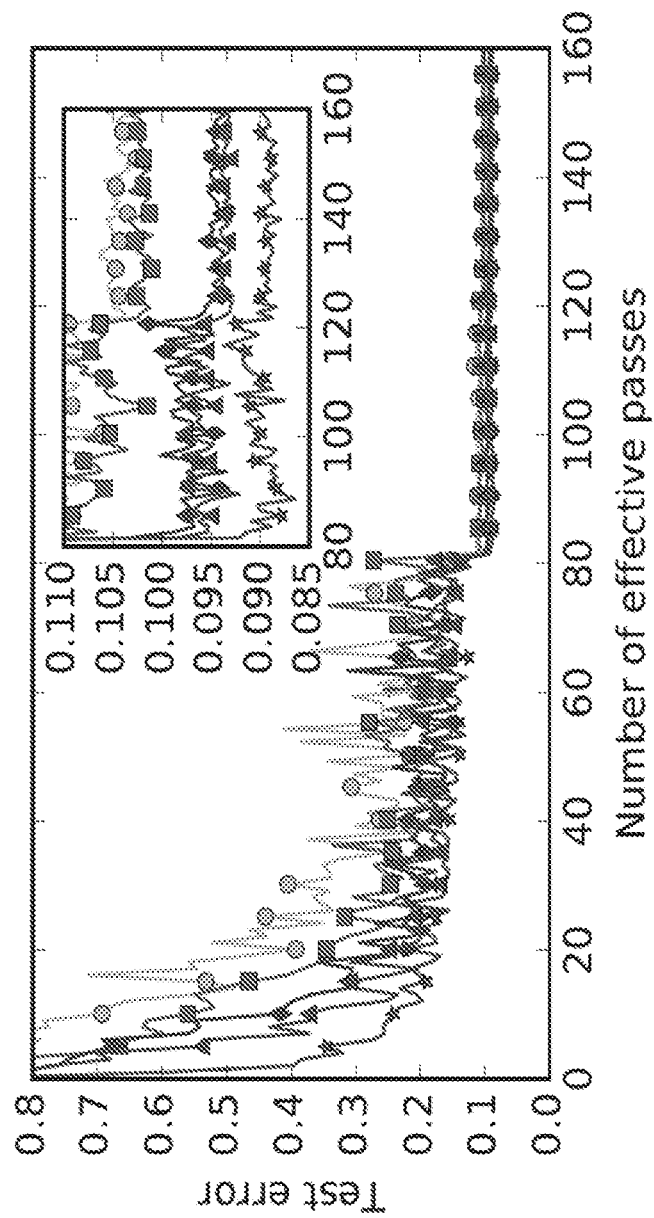
Figure 4A:
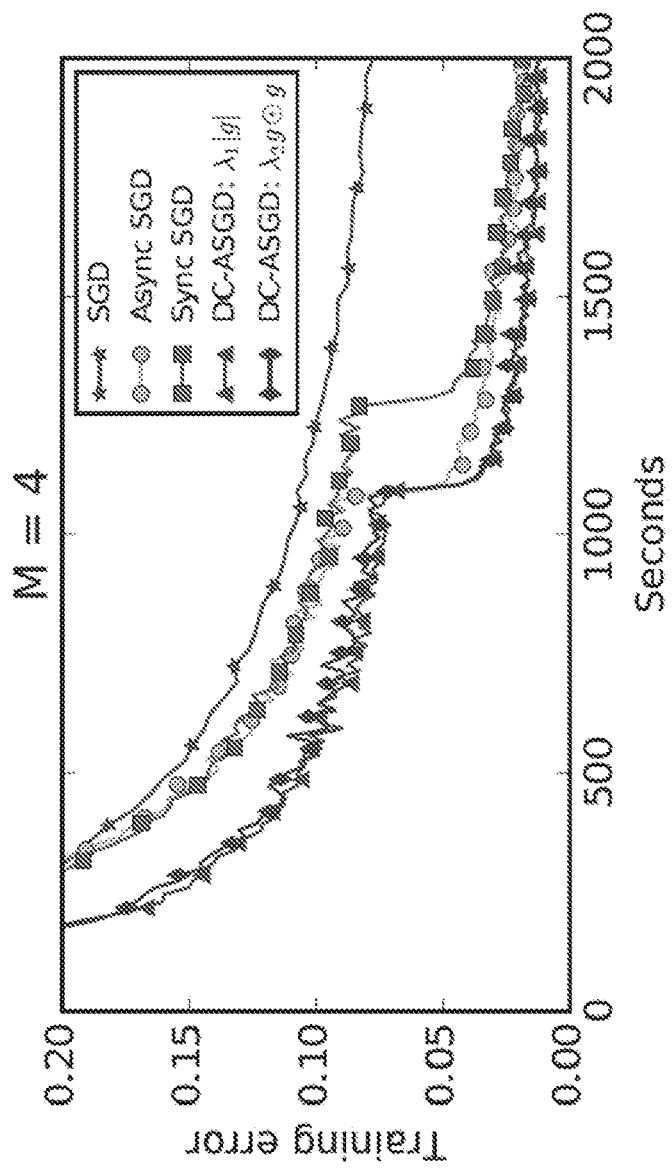
FIGS. 4A-4D illustrate graphs of performance comparison between the technical solution according to the implementations of the subject matter described herein and the conventional solution.
Figure 4B:
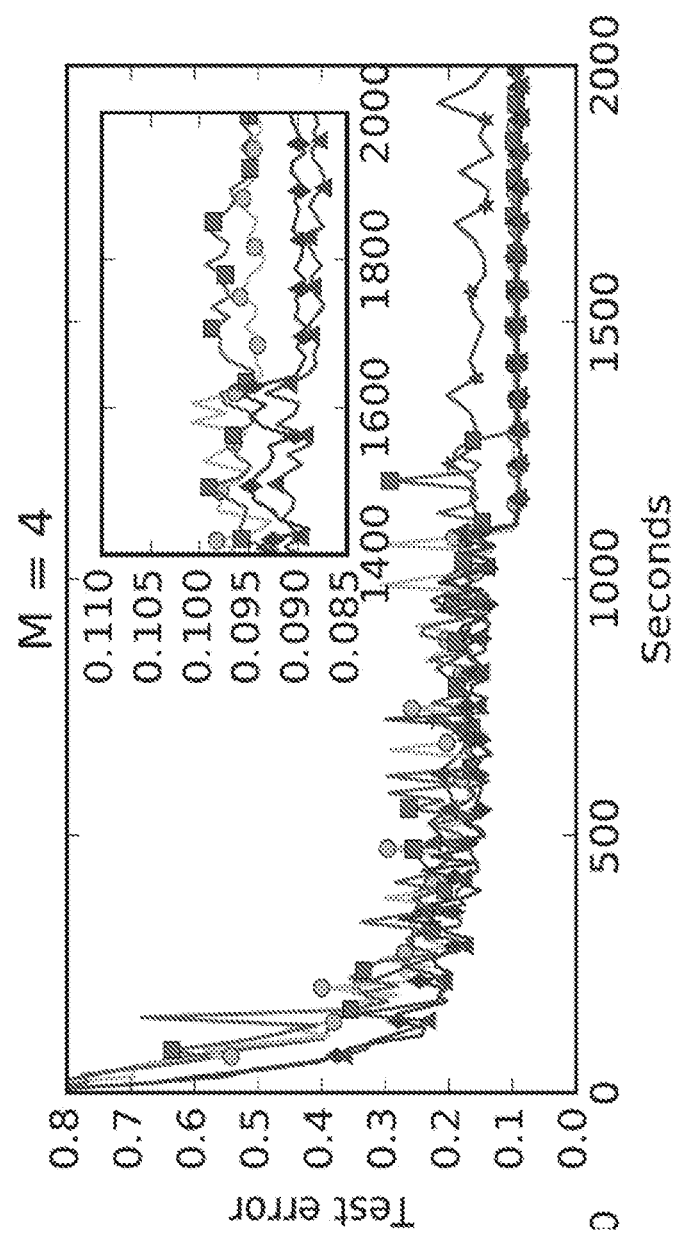
Figure 4C:
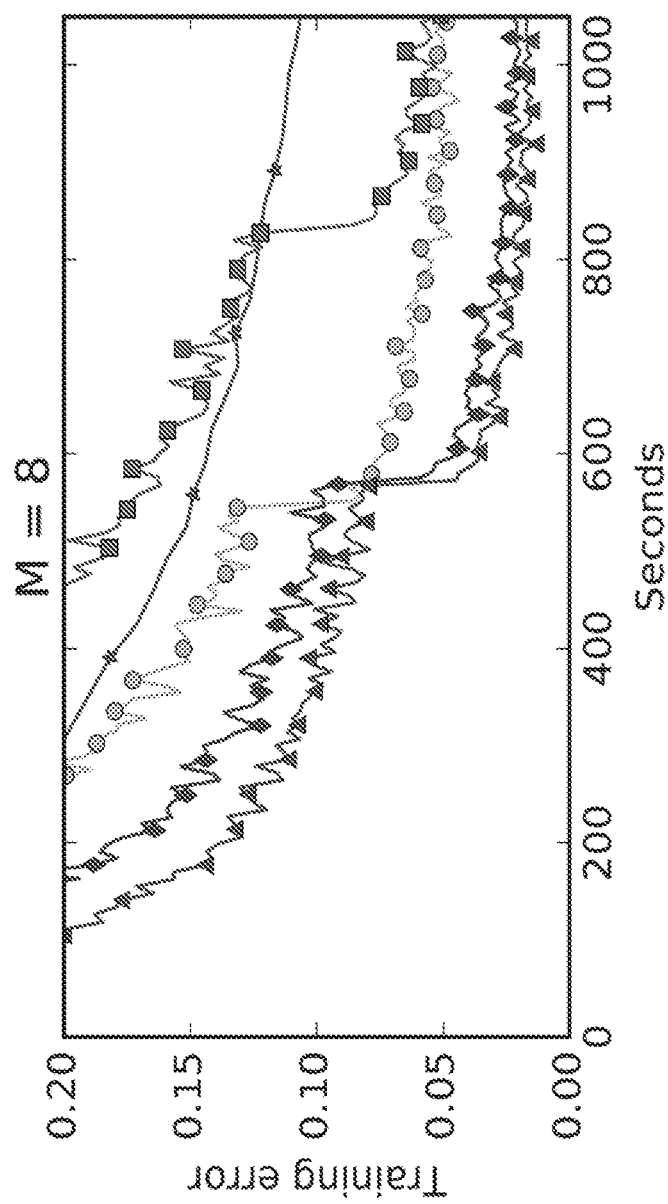
Figure 4D:
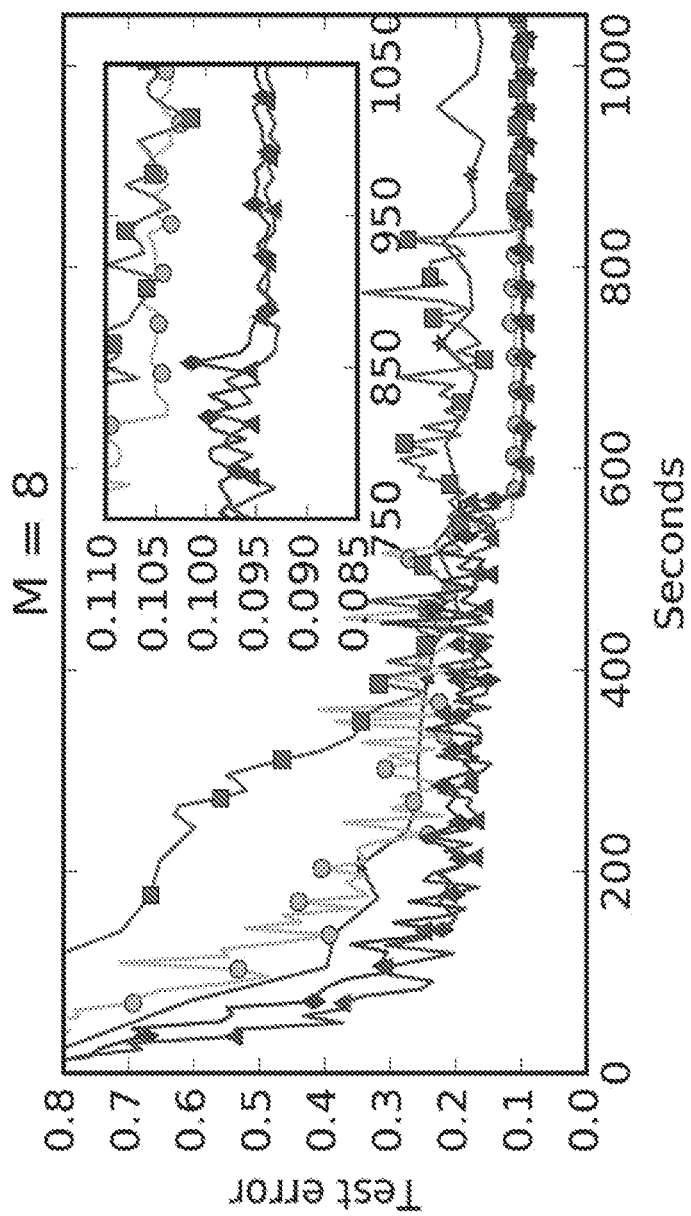

Still in reference to FIG. 2, at 204, the server 102 may determine the differences between the previous values $W_t$ and the current values $W_{t+\tau}$ of the model parameters. At 206, the server 102 updates the current values $W_{t+\tau}$ of the model parameters based on feedback data and the differences, thereby obtaining the updated values $W_{t+\tau+1}$ of the model parameters.

In some implementations, the previous model parameters may be the model parameters $\mathbf{W}_t$ stored as the backup model parameters $\mathbf{W}_{bak}(m)$ as described above. The updating amount of model parameters, namely, the differences between the updated values $\mathbf{W}_{t+\tau+1}$ and the current values $\mathbf{W}_{t+\tau}$, may be considered as a transformation of the differences between the current values $\mathbf{W}_{t+\tau}$ and the previous values $\mathbf{W}_t$ of the model parameters. In some implementations, the coefficients of transformation may be determined based on the significant trends of change and the differential amounts (namely, update amounts of model parameters) between the current values and the updated values of the model parameters may be determined by applying the transformation on the differences. By applying the update amounts on the current values $\mathbf{W}_{t+\tau}$, the updated values $\mathbf{W}_{t+\tau+1}$ of the set of parameters can be obtained. For instance, the transformation may be a linear transformation and the coefficients of transformation may be linear rates of change. Of course, any other suitable transformations may also be possible.

For the sake of convenience, the following description will be made still in reference to the ASGD approach. Again, it should be noted that it is only intended to elucidate the principles and ideas of the subject matter described herein, not to limit the scope of the subject matter described herein in any manner.

Ideally, the ASGD approach should add the gradient $g(\mathbf{W}_{t+\tau})$ into the global model parameters $w_{t+\tau}$ as the sequential SGD. However, in ASGD, a delayed gradient $g(\mathbf{W}_t)$ is added to the global model parameters $\mathbf{W}_{t+\tau}$.

The difference can be illustrated by a Taylor expansion. For example, the Taylor expansion of $g(\mathbf{W}_{t+\tau})$ at $\mathbf{W}_t$ can be expressed as $$g(\mathbf{W}_{t+\tau}) = g(\mathbf{W}_t) + \nabla g(\mathbf{W}_{t+\tau} - \mathbf{W}_t) + \mathcal{O}((\mathbf{W}_{t+\tau} - \mathbf{W}_t)^2)I_n \quad (3)$$

where $(\mathbf{W}_{t+\tau} - \mathbf{W}_t)^2 = (\mathbf{W}_{t+\tau,1} - \mathbf{W}_{t,n})^{\alpha_1} \ldots (\mathbf{W}_{t+\tau,n} - \mathbf{W}_{t,n})^{\alpha_n}$, $\tau^n{}_{i=1}\alpha_i = 2$, $\alpha_i \in \mathbb{N}$, $I_n$ represents an n-dimensional unit vector and the symbol $\mathcal{O}$ represents two or higher order terms.

It can be seen from equation (3) that the ASGD approach uses the zero-order term in the Taylor expansion as its approximation to the gradient $g(\mathbf{W}_{t+\tau})$, and ignores all the other terms. Therefore, if the difference between the delayed gradient $g(\mathbf{W}_t)$ and the gradient $g(\mathbf{W}_{t+\tau})$ is to be compensated for, all the other terms may be taken into account and respectively computed. However, this is not practical as it involves computing the sum of an infinite number of terms. According to the implementations of the subject matter described herein, only the zero-order and first-order terms in the Taylor expansion are kept and only the simplest compensation is made to the delayed gradient:

$$g(\mathbf{W}_{t+\tau}) \approx g(\mathbf{W}_t) + \nabla g(\mathbf{W}_t)(\mathbf{W}_{t+\tau} - \mathbf{W}_t) \quad (4)$$

The first-order derivative of the gradient reflects the rate of change of the gradient and corresponds to a second-order derivative of the loss function (for example, the cross entropy loss function as shown by equation (1)). The first-order derivative of the gradient can be represented by Hessian matrix which may be defined as:

$$Hf(w) = [h_{ij}] i, j = 1, \ldots, n, \text{ where } h_{ij} = \frac{\partial^2 f}{\partial w_i \partial w_j}(w).$$

Thus, the update amounts of parameters can be determined by combining equation (4) with the update rule of equation (2). The update amounts include two terms, one of which is a product of the delayed gradient and the learning rate and the other of which is a compensating term. Therefore, the update amounts of parameters can be considered as a linear transformation of the differences between the current values $w_{t+\tau}$ and the previous values $\mathbf{W}_t$ of the set of parameters while the linear transformation rate is a product of the learning rate and Hessian matrix. As the learning rate is an empirical parameter that may be predefined, the linear transformation rate may be considered to be equivalent to Hessian matrix.

However, although Hessian matrix can be computed directly in some implementations, the process might be difficult. For example, for a neural network model with a million parameters, the corresponding Hessian matrix will include trillions of elements. It is computationally complicated to obtain such a large matrix and such a matrix also requires a large storage space. Therefore, in some other implementations, the approximations that are easy to compute and/or store are used to approximate the Hessian matrix to make delay compensation more feasible.

For instance, in some implementations, the approximations of the first-order derivative (for example, Hessian matrix $Hf(\mathbf{W})$) can be obtained based on the feedback data (for example, the gradient $g(\mathbf{W}_t)$). In this way, the computational complexity will not be increased significantly.

For the sake of convenience, assume that the model is a neural network model and its optimization objective is represented by the cross entropy loss function well-known in the neural network models. Thus, for the cross entropy loss function $f(x, y, \mathbf{W}) = -\Sigma K{}_{k=1}(I_{[y=k]} \log \sigma^k(x; \mathbf{W}))$, assume that Y is a discrete random variable satisfying the distribution $\mathbb{P}(Y=k|X=x,w) = \sigma^k(x;\mathbf{W})$, where $k \in \{1, 2, \ldots, K\}$. It can be proved that $$\mathbb{E}_{(Y|x,w)} \frac{\partial^2}{\partial w^2} f(x, Y, w) = \mathbb{E}_{(Y|x,w)} \left(\frac{\partial}{\partial w} f(x, Y, w)\right) \otimes \left(\frac{\partial}{\partial w} f(x, Y, w)\right) \quad (5)$$

where $\otimes$ represents the outer product or tensor product for vectors, $$\mathbb{E}_{(Y|x,w)} \frac{\partial^2}{\partial w^2} f(x, Y, w)$$

represents the expected value of the second-order derivative $$\frac{\partial^2}{\partial w^2} f(x, Y, w)$$

of the loss function with respect to the model parameters in case that Y is of a distribution $\mathbb{P}(Y=k|X=x,w) = \sigma_k(x;w)$ $$\mathbb{E}_{(Y|x,w)} \left(\frac{\partial}{\partial w} f(x, Y, w)\right) \otimes \left(\frac{\partial}{\partial w} f(x, Y, w)\right)$$

represents the expected value of the outer product of first-order derivative $$\left(\frac{\partial}{\partial w}f(x, Y, w)\right) \otimes \left(\frac{\partial}{\partial w}f(x, Y, w)\right)$$

of the loss function with respect to the model parameters in case that Y is of the distribution $\mathbb{P}(Y=k \mid X=x, \mathbf{W})=\sigma k(x; \mathbf{W})$. For the sake of convenience, the detailed proving process is omitted.

For the cross entropy loss function, $\mathbb{E}(Y \mid x, \mathbf{W}) H f(x, Y, \mathbf{W}) = \mathbb{E}_{(Y \mid x, \mathbf{W})} G f(x, Y, \mathbf{W})$, so $G f(x, y, \mathbf{W})$ is unbiased estimate of $H f(x, Y, \mathbf{W})$, where $G f(\mathbf{W})$ is an outer product matrix of the gradient vector $g(\mathbf{W})$, namely, $G f(\mathbf{W}) = [g_{ij}]_{i,j=1, \ldots, n}$, where $g_{ij}$ represents elements of $G f(\mathbf{W})$. As described above, the Hessian matrix may be regarded as linear rates of change of the linear transformation for updating the parameters, so the tensor product may be regarded as an unbiased estimate of the linear rates of change.

Matrix $G f(\mathbf{W})$ may be obtained by performing a tensor product operation on the gradient vector $g(\mathbf{W})$. The tensor product operation is less computationally complicated, and thus can reduce the computational cost significantly. Moreover, in such an implementation, Hessian matrix can be replaced by linear transformation equivalently, and thus additional storage space to store additional variables may be saved and a great demand on the storage space would not be caused.

It is to be understood that although the outer product matrix of the gradient vector $G f(\mathbf{W})$ is described here as an example unbiased estimate of Hessian matrix with reference to the cross entropy loss function, this conclusion applies to other loss function or optimization objective, as long as the estimation of error is within an acceptable tolerance range.

However, the influence of variance on the unbiased estimation of Hessian matrix has not been taken into account, and thus a high approximation error for the Hessian matrix may be caused. Therefore, in some implementations, bias and variance may be considered concurrently. For example, the quality of approximation may be represented by a root-mean-square error.

In some implementations, to reduce the variance, a further approximation of the Hessian matrix may be used, $\sqrt{|Gf(\mathbf{W})|} \triangleq [\lambda_1 \sqrt{|g_{ij}|}]$, where symbol $\triangleq$ represents definition and $\lambda_1$ represents a controlling parameter. To simplify the symbols, for all $\sigma_k$, the range of $$\left|\frac{\partial \sigma_k}{\partial w_i}\right|$$

is represented by $[L_i, u_i]$ and $$C_{ij} = \left(\frac{u_i u_j}{l_i l_j}\right)^2 \text{ and } C'_{ij} = \frac{C_{ij}}{1+\lambda_2}$$

are defined.

For the cross entropy loss function, it can be proved that if the controlling parameter $\lambda_1$ satisfies $\text{sign}(\lambda_1) = \text{sign}(g_{ij})$, $0 \leq |\lambda_1| \leq 2 K \sqrt{l_i l_j}$ and $$\sum_{k=1}^{K} \frac{1}{\sigma_k^3(x, w)} \geq 2C_{ij}\left(\sum_{k=1}^{K} \frac{1}{\sigma_k(x, w)}\right)^2,$$

then the root-mean-square error of the approximator $\lambda_1 \sqrt{|g_{ij}|}$ is smaller than the approximator $g_{ij}$, where sign represents the sign function. Thus, by properly setting $\lambda_1$, $\lambda_1 \sqrt{|g_{ij}|}$ may achieve a smaller root-mean-square error than $g_{ij}$.

It is to be understood that the above approximation is only exemplary and not intended to limit the subject matter described herein. For example, in some other implementations, to reduce variance, another approximation of Hessian matrix $\lambda_2 G f(\mathbf{W}) \triangleq [\lambda_2 g_{ij}]$ may be employed, where $\lambda_2$ represents a controlling parameter.

For the cross entropy loss function, it can be proven that if $\lambda_2 \in [0,]$ and $\sigma k$ satisfies $$\sum_{k=1}^{K} \frac{1}{\sigma_k^3(x, w)} \geq 2C'_{ij}\left(\sum_{k=1}^{K} \frac{1}{\sigma_k(x, w)}\right)^2,$$

then the root-mean-square error of the approximation $\lambda_2 g_{ij}$ is smaller than the approximation $g_{ij}$. Therefore, by properly setting $\lambda_2$, $\lambda_2 g_{ij}$ can achieve a smaller root-mean-square error than $g_{ij}$.

The above conclusions only provide the range of the controlling parameters $\lambda_1$ and $\lambda_2$ for the cross entropy loss function. Nevertheless, it is to be understood that there is a proper range for other loss functions. Meanwhile, during specific implementation, the range of the controlling parameters $\lambda_1$ and $\lambda_2$ may be set over a large range based on experience and specific implementation.

It is very easy to compute approximations $\lambda_1 \sqrt{|Gf(\mathbf{W})|}$ and $\lambda_2 Gf(\mathbf{W})$ based on the local gradient $g(\mathbf{W}_t)$ to achieve good trade-off between bias and variance of approximations. In this way, the Hessian matrix can be computed in a more economical way.

Further, in some implementations, the magnitudes of the derivatives of the loss function with respect to respective parameters in the set of parameters can be determined based on the gradient $g(\mathbf{W}_t)$ and the magnitude of a derivative represents the dimension or absolute value of the derivative. Then, the linear rates of change may be determined based on the magnitudes of the derivatives. Specific implementations will be described in the following in connection with the approximations $\lambda_1 \sqrt{|Gf(\mathbf{W})|}$ and $\lambda_2 Gf(\mathbf{W})$.

In some implementations, only the diagonal elements of the approximation $\lambda_1 \sqrt{Gf(\mathbf{W})}$ of Hessian matrix are used. Therefore, the update rule for the global model parameters becomes:

$$\mathbf{W}_{t+\tau+1} = \mathbf{W}_{t+\tau} - \eta(g(\mathbf{W}_t) + \text{diag}(\lambda_1 \sqrt{|Gf(\mathbf{W}_t)|}))$$
$$(\mathbf{W}_{t+\tau} - \mathbf{W}_t)) \quad (6)$$

which is equivalent to:

$$\mathbf{W}_{t+\tau+1} = \mathbf{W}_{t+\tau} - \eta(g(\mathbf{W}_t) + \lambda_1 |g(\mathbf{W}_t)| \odot (\mathbf{W}_{t+\tau} - \mathbf{W}_t)) \quad (7)$$

where diag represents the diagonal elements of the matrix, $\odot$ represents element wise multiplication and equations (6) and (7) are two completely equivalent forms of representation.

According to equation (7), the magnitudes of the derivatives of the loss function with respect to respective parameters in the set of parameters may be determined based on the gradient $g(\mathbf{W}_t)$. Mathematically, the magnitudes of the derivatives can be represented by its absolute value. In some implementations, the linear rates of change may be determined directly by the magnitude of each derivative so as to determine the compensating term. In other words, the vector formed by the absolute value of each element of the gradient $g(\mathbf{W}_t)$ can be used as the linear rate of change, which differs from the compensating term by at most an adjusting parameter, for instance, a product of the learning rate $\eta$ and the controlling parameter $\lambda_2$. As the absolute value operation has very low computational complexity, it can reduce the computational cost considerably and avoid the usage of additional storage space to store additional variables and it would not cause an additional demand on storage space.

Alternatively, in some other implementations, only the diagonal elements of the approximation $\lambda_2 G f(\mathbf{W})$ of Hessian matrix are used. Thus, the update rule of the global model parameters becomes:

$$\mathbf{W}_{t+\tau+1} = \mathbf{W}_{t+\tau} - \eta(g(\mathbf{W}_t) + \text{diag}\ (\lambda_2 G f(\mathbf{W}_t))\ (\mathbf{W}_{t+\tau} - \mathbf{W}_t)) \quad (8)$$

which is equivalent to $$\mathbf{W}_{t+\tau+1} = \mathbf{W}_{t+\tau} - \eta(g(\mathbf{W}_t) + \lambda_2\ g(\mathbf{W}_t) \odot g(\mathbf{W}_t) \odot (\mathbf{W}_{t+\tau} - \mathbf{W}_t)) \quad (9).$$

According to equation (9), squares of the derivatives of the loss function with respect to respective parameters in the set of parameters can be determined based on gradient $g(\mathbf{W}_t)$ and the linear rates of change can be determined based on the square of each derivative, so as to determine the compensating term. In other words, in such implementations, the vector formed by the square of the absolute value (not the absolute value per se) for each element in the gradient $g(\mathbf{W}_t)$ can be used as the linear rate of change which differs from the compensating term by at most an adjusting parameter, for instance, a product of learning rate $\eta$ and controlling parameter $\lambda_2$. As the square computation has very low computational complexity, it can reduce the computational cost considerably and avoid the usage of additional storage space to store additional variables and it would not cause an additional demand on storage space.

As the learning rate $\eta$ may become smaller consecutively with the training process of the model, the controlling parameter should be adjusted correspondingly. It can be seen from the above update rule that as the coefficients of the compensating term per se are influenced by the product of the controlling parameter and the learning rate, in some implementations, the controlling parameter is adjusted such that the product of the controlling parameter and the learning rate remains substantially constant. Therefore, in this case, the overall controlling parameter of the compensating term may be regarded to be kept constant.

In some implementations, as shown in FIG. 1, when the model parameters are updated from $\mathbf{W}_{t+\tau}$ to $\mathbf{W}_{t+\tau+1}$, the server 102 may automatically transmit the updated model parameters to the worker 104. Alternatively or additionally, the server 102 may also transmit the updated model parameters $\mathbf{W}_{t+\tau+1}$ to the worker 104 in response to a request from the worker 104 for model parameters.

According to the implementations of the subject matter described herein, compared with the conventional ASGD approach, the workers (for example, worker 104 and/or worker 106) may not be required for additional computation but the local gradient $g(\mathbf{W}_t)$ computation. In addition, the server 102 also only needs to implement less complex computation. Even if the approximation requires the outer product matrix $Gf(\mathbf{W})$ to be computed, only the outer product operation of vectors is required to be performed. In case of the approximation that only the diagonal elements of $\lambda_1 \sqrt{|Gf(\mathbf{W})|}$ and $\lambda_2 Gf(\mathbf{W})$ are taken into account, the computing complexity is further reduced.

For each worker, the server 102 only needs to store backup model parameters $w_{bak}(m)$, where $m$ may be 1, 2, . . . , M, and M is the total number of the workers. However, generally it will not affect or reduce the system performance. In some implementations, the server 102 is implemented in a distributional approach, so its usable storage space will be much beyond the capacity of a single machine. Alternatively or additionally, the workers (for example, worker 104 and/or worker 106) may transmit the gradient to the server 102 along with its respective global parameters. In this way, it is not necessary to deploy large-capacity storage space at the side of the server 102, but the communication cost between the workers (for example, worker 104 and/or worker 106) and the server will be doubled.

Experiment and Performance

FIGS. 3A-3D and FIGS. 4A-4D illustrate graphs of performance comparison between the technical solution according to the implementations of the subject matter described herein and the conventional solution. FIGS. 3A-3D and FIGS. 4A-4D are tested on CIFAR-10 dataset. For all the algorithms, 60 iterations are performed with a mini-batch size of 128, and an initial learning rate of 0.5 which is reduced by ten times after 80 and 120 iterations. According to the implementations of the subject matter described herein, the controlling parameters $\lambda_1$ and $\lambda_2$ are set initially as 2 and 0.04 respectively and are increased by ten times when the learning rate changes.

FIGS. 3A-3D illustrate convergence curves with fixed number of effective passes. Sequential SGD achieves the best training accuracy, and its final test error is 8.75%. The performances of Async SGD (ASGD) and Sync SGD (SSGD) are not very good, whose test errors will increase with respect to the number of workers. In case that there are four workers (M=4), ASGD and SSGD achieve test errors of 9.39% and 9.35%, respectively. In case that there are eight workers (M=8), their test errors become 10.4% and 10.1%, respectively. This is because ASGD suffers from the problem of delayed gradient which becomes more serious for larger number of workers. SSGD will increase the mini-batch size, thereby affect the training performances of the model. In contrast, for Delay Compensated ASGD (DC-ASGD) according to the implementations of the subject matter described herein, performances of the two approximations (i.e. approximations $\lambda_1|g|$ and $\lambda_2 g \odot g$ based on the diagonal elements of the outer product of the gradient) are significantly superior to ASGD and SSGD and almost catch up with sequential SGD. For instance, when there are four workers, the test error of DC-ASGD reaches 8.69%, which is substantially indistinguishable from that achieved by sequential SGD. When there are eight workers, the test error of DC-ASGD can be reduced to 9.27%, which is significantly more advantageous than conventional ASGD and SSGD.

FIGS. 4A-4D illustrate graphs of comparison of convergence speed between the solution according to the implementations of the subject matter described herein and the conventional solution. ASGD is indeed very fast and achieves almost linear speed-up as compared to sequential SGD, while the convergent point is not very good. SSGD is also faster than sequential SGD. However, due to the cost of synchronization, it is significantly slower than ASGD. DC-ASGD achieves a very good balance between accuracy and speed. On the one hand, its convergent speed is very similar to that of conventional ASGD and its convergent point is substantially as good as that of sequential SGD.

Example Device

Figure 5:
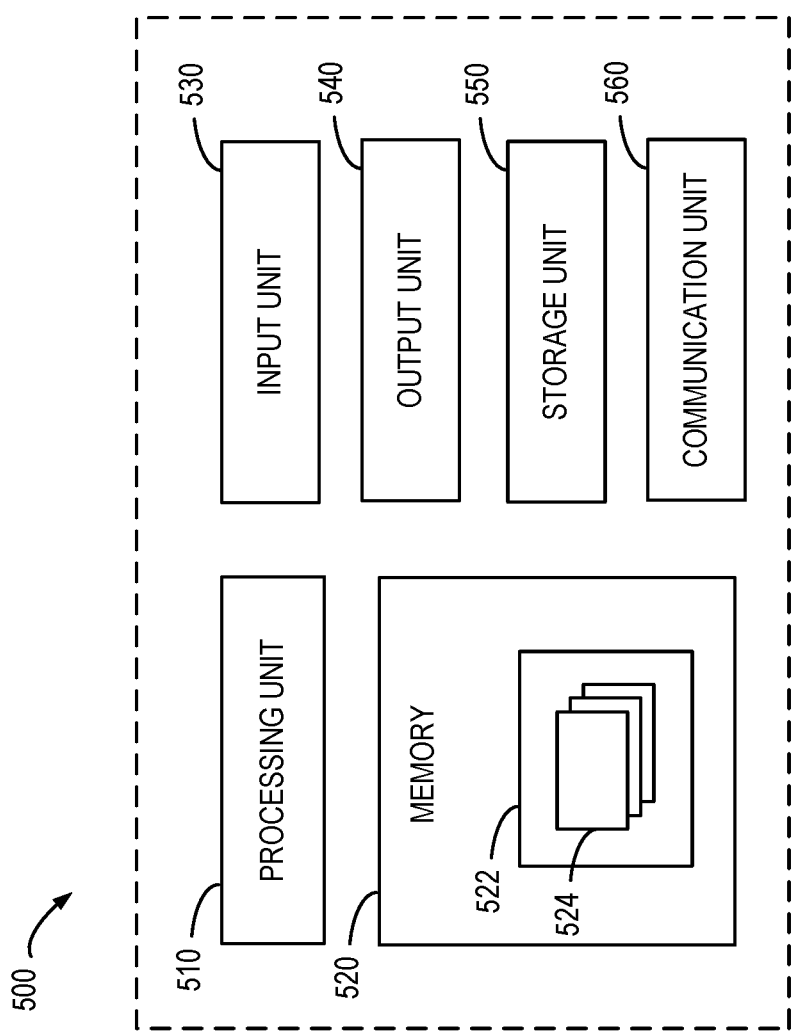
FIG. 5 illustrates a block diagram of a computing system/server in which one or more implementations according to the subject matter described herein can be implemented.

FIG. 5 shows a block diagram of an example computing system/server 500 in which one or more implementations of the subject matter described herein may be implemented. The server 102, the worker 104, or both of them may be implemented by the computing system/server 500. The computing system/server 500 as shown in FIG. 5 is only an example, which should not be constructed as any limitation to the function and scope of use of the implementations of the subject matter described herein.

As shown in FIG. 5, the computing system/server 500 is in a form of a general-purpose computing device. Components of the computing system/server 500 may include, but are not limited to, one or more processors or processing units 510, a memory 520, one or more input devices 530, one or more output devices 540, storage 550, and one or more communication units 560. The processing unit 510 may be a real or a virtual processor and is capable of performing various processes in accordance with a program stored in the memory 520. In a multi-processing system, multiple processing units execute computer-executable instructions to increase processing power.

The computing system/server 500 typically includes a variety of machine readable medium. Such medium may be any available medium that is accessible by the computing system/server 500, including volatile and non-volatile medium, removable and non-removable medium. The memory 520 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 550 may be removable or non-removable, and may include machine readable medium such as flash drives, magnetic disks or any other medium which can be used to store information and which can be accessed within the computing system/server 500.

The computing system/server 500 may further include other removable/non-removable, volatile/non-volatile computing system storage medium. Although not shown in FIG. 5, a disk driver for reading from or writing to a removable, non-volatile disk (e.g., a "floppy disk"), and an optical disk driver for reading from or writing to a removable, non-volatile optical disk can be provided. In these cases, each driver can be connected to the bus 18 by one or more data medium interfaces. The memory 520 may include at least one program product having a set (e.g., at least one) of program modules that are configured to carry out the functions of various implementations of the subject matter described herein.

A program/utility tool 522 having a set (at least one) of the program modules 524 may be stored in, for example, the memory 520. Such program modules 524 include, but are not limited to, an operating system, one or more applications, other program modules, and program data. Each or a certain combination of these examples may include an implementation of a networking environment. The program modules 524 generally carry out the functions and/or methodologies of implementations of the subject matter described herein, for example, the method 900 and/or the method 1000.

The input unit(s) 530 may be one or more of various different input devices. For example, the input unit(s) 530 may include a user device such as a mouse, keyboard, trackball, etc. The communication unit(s) 560 enables communication over communication medium to another computing entity. Additionally, functionality of the components of the computing system/server 500 may be implemented in a single computing machine or in multiple computing machines that are able to communicate over communication connections. Thus, the computing system/server 500 may operate in a networked environment using logical connections to one or more other servers, network personal computers (PCs), or another common network node. By way of example, and not limitation, communication media include wired or wireless networking techniques.

The computing system/server 500 may also communicate, as required, with one or more external devices (not shown) such as a storage device, a display device, and the like, one or more devices that enable a user to interact with the computing system/server 500, and/or any device (e.g., network card, a modem, etc.) that enables the computing system/server 500 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Example Implementations

Some example implementations are illustrated below.

In some implementations, there is provided a computer-implemented method. The method comprises: receiving, from a worker, feedback data generated by training a machine learning model, the feedback data being associated with previous values of a set of parameters of the machine learning model at the worker; determining differences between the previous values and current values of the set of parameters; and updating the current values based on the feedback data and the differences to obtain updated values of the set of the parameters.

In some implementations, the feedback data indicate significant trends of change of an optimization objective of the machine learning model with respect to the previous values of the set of parameters.

In some implementations, updating the current values comprises: determining coefficients of a transformation based on the significant trends of change; and determining differential amounts between the current values and the updated values by applying the transformation on the differences.

In some implementations, the transformation is a linear transformation, the coefficients are linear rates of change, and the significant trends of change are represented by a gradient of the optimization objective with respect to the previous values of the set of parameters.

In some implementations, determining the coefficients of the transformation comprises: computing a tensor product of the gradient as unbiased estimates of the linear rates of change.

In some implementations, determining the coefficients of the transformation comprises: determining, based on the gradient, magnitudes of rates of change of the optimization objective with respect to respective parameters in the set of parameters; and determining the linear rates of change based on the magnitudes of the rates of change.

In some implementations, determining the linear rates of change based on the magnitudes of the rates of change comprises: computing squares of the magnitudes of the rates of change; and determining the linear rates of change based on the squares of the magnitudes of the rates of change.

In some implementations, the method further comprises: receiving a request for the set of parameters from the worker; and in response to the request, transmitting the updated values of the set of parameters to the worker.

In some implementations, the machine learning model includes a neural network model and the optimization objective is represented by a cross entropy loss function.

In some implementations, there is provided a device, comprising: a processing unit; a memory coupled to the processing unit and storing instructions for execution by the processing unit, the instructions, when executed by the processing unit, causing the electronic device to perform acts comprising: receiving, from a worker, feedback data generated by training a machine learning model, the feedback data being associated with previous values of the set of parameters of the machine learning model at the worker; determining differences between the previous values and current values of the set of parameters; and updating the current values based on the feedback data and the differences to obtain the updated values of the set of the parameters.

In some implementations, the feedback data indicate significant trends of change of an optimization objective of the machine learning model with respect to the previous values of the set of parameters.

In some implementations, updating the current values comprises: determining coefficients of a transformation based on the significant trends of change; and determining differential amounts between the current values and the updated values by applying the transformation on the differences.

In some implementations, the transformation is a linear transformation, the coefficients are linear rates of change, and the significant trends of change are represented by a gradient of the optimization objective with respect to the previous values of the set of parameters.

In some implementations, determining the coefficients of the transformation comprises: computing a tensor product of the gradient as unbiased estimates of the linear rates of change.

In some implementations, determining the coefficients of the transformation comprises: determining, based on the gradient, magnitudes of rates of change of the optimization objective with respect to respective parameters in the set of parameters; and determining the linear rates of change based on the magnitudes of the rates of change.

In some implementations, determining the linear rates of change based on the magnitudes of the rates of change comprises: computing squares of the magnitudes of the rates of change; and determining the linear rates of change based on the squares of the magnitudes of the rates of change.

In some implementations, the acts further comprise: receiving a request for the set of parameters from the worker; and in response to the request, transmitting the updated values of the set of parameters to the worker.

In some implementations, the machine learning model includes a neural network model and the optimization objective is represented by a cross entropy loss function.

In some implementations, there is provided a computer program product stored in a non-transitory computer storage medium and comprising machine executable instructions which, when executed in a device, cause the device to: receive, from the worker, feedback data generated by training a machine learning model, the feedback data being associated with previous values of the set of parameters of the machine learning model at the worker; determine differences between the previous values and current values of the set of parameters; and update the current values, based on the feedback data and the differences, to obtain the updated values of the set of the parameters.

In some implementations, the feedback data indicate significant trends of change of the optimization objective of the machine learning model with respect to the previous values of the set of parameters.

In some implementations, updating the current values comprises: determining coefficients of a transformation based on the significant trends of change; and determining differential amounts between the current values and the updated values by applying the transformation on the differences.

In some implementations, the transformation is a linear transformation, the coefficients are linear rates of change, and the significant trends of change are represented by a gradient of the optimization objective with respect to the previous values of the set of parameters.

In some implementations, determining the coefficients of the transformation comprises: computing a tensor product of the gradient as unbiased estimates of the linear rates of change.

In some implementations, determining the coefficients of the transformation comprises: determining, based on the gradient, magnitudes of rates of change of the optimization objective with respect to respective parameters in the set of parameters; and determining the linear rates of change based on the magnitudes of the rates of change.

In some implementations, determining the linear rates of change based on the magnitudes of the rates of change comprises: computing squares of the magnitudes of the rates of change; and determining the linear rates of change based on the squares of the magnitudes of the rates of change.

In some implementations, the machine executable instructions further cause the device to: receive a request for the set of parameters from the worker; and in response to the request, transmit the updated values of the set of parameters to the worker.

In some implementations, the machine learning model includes a neural network model and the optimization objective is represented by a cross entropy loss function.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method comprising:
  receiving, by a computing device from a worker implemented by a computer processing unit, feedback data generated by training a machine learning model, the feedback data being associated with previous values of a set of parameters of the machine learning model at the worker;
  determining, by the computing device, differences between the previous values and current values of the set of parameters;
  calculating a zero-order term and a first-order term of a series expansion based on the feedback data and the differences; and
  updating the current values based on the zero-order term and the first-order term to obtain updated values of the set of the parameters, wherein updating the current values based on the zero-order term and the first-order term:
    comprises applying update amounts to the current values, the update amounts including a term that is a product of a delayed gradient and a learning rate; and
    provides compensation for delay between a plurality of workers implemented by one or more computer processing units that each provide respective feedback data generated by training the machine learning model, the compensation for delay reducing mismatch between the plurality of workers and enabling efficient asynchronous training of the machine learning model.

2. The method of claim 1, wherein the feedback data indicates trends of change of an optimization objective of the machine learning model with respect to the previous values of the set of parameters.

3. The method of claim 2, wherein updating the current values comprises:
  determining coefficients of a transformation based on the trends of change; and
  determining differential amounts between the current values and the updated values by applying the transformation on the differences.

4. The method of claim 3, wherein the transformation is a linear transformation, the coefficients are linear rates of change, and the trends of change are represented by a gradient of the optimization objective with respect to the previous values of the set of parameters.

5. The method of claim 4, wherein determining the coefficients of the transformation comprises:
  computing a tensor product of the gradient as unbiased estimates of the linear rates of change.

6. The method of claim 4, wherein determining the coefficients of the transformation comprises:
  determining, based on the gradient, magnitudes of rates of change of the optimization objective with respect to respective parameters in the set of parameters; and
  determining the linear rates of change based on the magnitudes of the rates of change.

7. The method of claim 6, wherein determining the linear rates of change based on the magnitudes of the rates of change comprises:
  computing squares of the magnitudes of the rates of change; and
  determining the linear rates of change based on the squares of the magnitudes of the rates of change.

8. The method of claim 1, further comprising:
  receiving a request for the set of parameters from the worker; and
  in response to the request, transmitting the updated values of the set of parameters to the worker.

9. The method of claim 2, wherein the machine learning model includes a neural network model and the optimization objective is represented by a cross entropy loss function.

10. An electronic device comprising:
  a first processing unit;
  a memory coupled to the first processing unit and storing instructions that, when executed by the first processing unit, cause the electronic device to perform acts comprising:
    receiving, from a worker implemented by a second processing unit, feedback data generated by training a machine learning model, the feedback data being associated with previous values of a set of parameters of the machine learning model at the worker;
    determining differences between the previous values and current values of the set of parameters;
    calculating a zero-order term and a first-order term of a series expansion based on the feedback data and the differences; and
    updating the current values based on the zero-order term and the first-order term to obtain updated values of the set of the parameters, wherein updating the current values provides compensation for delay between a plurality of workers providing respective feedback data generated by training the machine learning model, the compensation for delay reducing mismatch between the plurality of workers and enabling efficient asynchronous training of the machine learning model, and wherein update amounts applied to the current values as part of the updating include a term that is a product of a delayed gradient and a learning rate.

11. The device of claim 10, wherein the feedback data indicate trends of change of an optimization objective of the machine learning model with respect to the previous values of the set of parameters.

12. The device of claim 11, wherein updating the current values comprises:
determining coefficients of a transformation based on the trends of change; and
determining differential amounts between the current values and the updated values by applying the transformation on the differences.

13. The device of claim 12, wherein the transformation is a linear transformation, the coefficients are linear rates of change, and the trends of change are represented by the delayed gradient of the optimization objective with respect to the previous values of the set of parameters.

14. The device of claim 13, wherein determining the coefficients of the transformation comprises:
computing a tensor product of the delayed gradient as unbiased estimates of the linear rates of change.

15. A system comprising:
a processor; and
a memory coupled to the processor and storing instructions that, when executed by the processor, cause a computing device to:
receive, from a worker implemented by a processing unit, feedback data generated by training a machine learning model, the machine learning model being a neural network comprising multiple layers, the feedback data being associated with previous values of a set of parameters of the machine learning model at the worker;
determine differences between the previous values and current values of the set of parameters;
calculate a zero-order term and a first-order term of a series expansion based on the feedback data and the differences;
update the current values based on the zero-order term and the first-order term; and
compensate for delay between a plurality of workers providing respective feedback data generated during training of the machine learning model by updating the current values based on the zero-order term and the first-order term, wherein compensating for the delay reduces mismatch between the plurality of workers and enables efficient asynchronous training of the machine learning model.

16. The system of claim 15, wherein the machine learning model is trained using training data that is randomly sampled from a complete set of training data.

17. The system of claim 15, wherein series expansion corresponds to Taylor expansion and other order terms of the series expansion are not used to update the current values.

18. The system of claim 15, wherein the first-order term reflects a rate of change of a gradient of an optimization objective.

19. The system of claim 15, wherein the first-order term corresponds to a second-order derivative of a cross entropy loss function.

20. The system of claim 15, wherein the instructions, when executed, further cause the computing device to:
use the trained machine learning model to perform a task.

* * * * *